(12) United States Patent
Tsirkin

(10) Patent No.: US 10,664,301 B2
(45) Date of Patent: May 26, 2020

(54) METHODS AND SYSTEMS FOR ESTABLISHING CONNECTIONS ASSOCIATED WITH VIRTUAL MACHINE MIGRATIONS

(71) Applicant: Red Hat Israel, Ltd., Ra'anana (IL)

(72) Inventor: Michael Tsirkin, Westford, MA (US)

(73) Assignee: RED HAT ISRAEL, LTD., Ra'anana (IL)

( * ) Notice: Subject to any disclaimer, the term of this patent is extended or adjusted under 35 U.S.C. 154(b) by 123 days.

(21) Appl. No.: 15/936,077

(22) Filed: Mar. 26, 2018

(65) Prior Publication Data
US 2018/0217861 A1 Aug. 2, 2018

Related U.S. Application Data

(63) Continuation of application No. 14/630,324, filed on Feb. 24, 2015, now Pat. No. 9,928,093.

(51) Int. Cl.
*G06F 9/46* (2006.01)
*G06F 9/455* (2018.01)

(52) U.S. Cl.
CPC .. *G06F 9/45558* (2013.01); *G06F 2009/4557* (2013.01)

(58) Field of Classification Search
CPC .............. G06F 9/45558; G06F 2009/4557
See application file for complete search history.

(56) References Cited

U.S. PATENT DOCUMENTS

| 7,970,913 | B2 | 6/2011 | Machulsky et al. |
| 8,370,530 | B2 | 2/2013 | Tripathi |
| 8,700,811 | B2 | 4/2014 | Oshins et al. |
| 2006/0013253 | A1* | 1/2006 | Hufferd ............... H04L 69/18 370/466 |
| 2008/0186990 | A1 | 8/2008 | Abali et al. |
| 2008/0189432 | A1 | 8/2008 | Abali et al. |
| 2008/0313349 | A1 | 12/2008 | Nickoll |

(Continued)

OTHER PUBLICATIONS

Scarpazza, D.P., Mullaney, P., Villa, O., Petrini, F., Tipparaju, V., Brown, D.M.L., Nieplocha, J., Transparent System-Level Migration of PGAS Applications Using Xen on InfiniBand, Sep. 17-20, 2007, 2 pages, Pacific Northwest Nat. Lab., Richland, WA retrieved from http://ieeexplore.ieee.org/xpl/login.jsp?tp=&arnumber=4629219&url=http%3A%2F%2Fieeexplore.ieee.org%2Fxpls%2Fabs_all.jsp%3Farnumber%3D4629219 on Feb. 20, 2015.

(Continued)

*Primary Examiner* — Camquy Truong

(74) *Attorney, Agent, or Firm* — Haynes and Boone, LLP

(57) ABSTRACT

An example method of establishing one or more connections between a target host machine and a remote endpoint connected to a virtual machine (VM) running on a source host machine includes receiving, by a target hypervisor executable on a target host machine, a list of one or more remote endpoints to which a VM executable on a source host machine is connected. The source and target host machines are coupled to a network. The method further includes initiating, by a host communication manager executable on the target host machine, a connection to one or more of the remote endpoints specified in the list before the VM has completed migration from the source host machine to the target host machine.

20 Claims, 7 Drawing Sheets

(56) References Cited

U.S. PATENT DOCUMENTS

| | | |
|---|---|---|
| 2011/0126269 A1* | 5/2011 | Youngworth ......... G06F 12/109 726/4 |
| 2011/0283278 A1 | 11/2011 | Murrell |
| 2012/0054264 A1 | 3/2012 | Haugh et al. |
| 2013/0086200 A1 | 4/2013 | Alanis et al. |
| 2013/0254368 A1 | 9/2013 | Guay et al. |
| 2014/0351396 A1 | 11/2014 | Stabile |
| 2015/0317280 A1 | 11/2015 | Magro |
| 2017/0005908 A1 | 1/2017 | Johnsen |
| 2018/0143866 A1* | 5/2018 | Das ...................... G06F 9/5077 |

OTHER PUBLICATIONS

W. Huang, J. Liu, M. Koop, B. Abali, D. K. Panda; Nomad: Migrating OS-Bypass Networks in Virtual Machines, Jun. 13-15, 2007, 11 pages, Computer Science and Engineering The Ohio State University Columbus, OH 43210; IBM T. J. Watson Research Center 19 Skyline Drive Hawthorne, NY 10532 retrieved from http://mvapich.cse.ohio-state.edu/static/media/publications/abstract/huang-vee07.pdf on Feb. 20, 2015.

I/O Virtualization Using Mellanox InfiniBand and Channel I/O Virtualization (CIOV) Technology, 2007, 16 pages; Mellanox Technologies Inc. retrieved from http://www.mellanox.com/pdf/whitepapers/WP_Virtualize_with_IB.pdf on Feb. 20, 2015.

\* cited by examiner

600

602 — A list of one or more remote endpoints to which a VM executable on a source host machine is connected is received, the source and target host machines being coupled to a network 604 — A connection to one or more of the remote endpoints specified in the list is initiated before the VM has completed migration from the source host machine to the target host machine

FIG. 6

METHODS AND SYSTEMS FOR ESTABLISHING CONNECTIONS ASSOCIATED WITH VIRTUAL MACHINE MIGRATIONS

RELATED APPLICATIONS

This application is a continuation of U.S. patent application Ser. No. 14/630,324, filed Feb. 24, 2015, and entitled "Methods and Systems for Establishing Connections Associated with Virtual Machine Migrations", the disclosure of which is hereby incorporated by reference in its entirety.

TECHNICAL FEILD

The present disclosure is generally related to computer systems, and is more specifically related to establishing connections associated with virtual machine migrations.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). An OS is a set of programs that manages computer hardware resources and provides common services for application software. For hardware functions such as input and output and memory allocation, the OS typically acts as an intermediary between application programs and hardware. OSs may be found on a variety of devices, including desktop computers, servers, smartphones, video game consoles, and so forth.

A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including an OS known as a guest OS or guest. The hypervisor virtualizes the underlying hardware of the host machine or emulates hardware devices, making the use of the VM transparent to the guest or the remote client using the VM. Typically, a hypervisor manages allocation and virtualization of computer resources and performs context switching, as may be necessary, to cycle between various VMs.

A host machine may be interconnected to an InfiniBand (IB) fabric. IB architecture developed by the Infiniband Trade Association (IB TA) defines a System Area Network (SAN) for interconnecting processor nodes and input/output (I/O) nodes through an IB fabric made of cascaded switches. Each IB node or switch may attach to a single or multiple switches or directly to another IB node or switch. An IB node connects to the fabric via a host channel adapter. Two or more IB subnets may be interconnected by one or more IB routers.

An IB endpoint may be identified by an IB service ID (SIDR). Alternatively, an IB endpoint may be identified by an internet protocol (IP) address and port number when, for example, using IP over IB. A port number may include a local identifier (LID) and a global identifier (GID). A LID is a 16-bit value that may be assigned when the corresponding port becomes active. A GID is a 128-bit value that may be formed by concatenating a 64-bit IB subnet prefix and a 64-bit GUID (Global Unique Identifier). Both the subnet prefix of the GID and LID may be assigned by a subnet manager, which is a component performing configuration and control of the subnet. IB architecture supports several methods of data transfer, also referred to as IB transports, including unreliable datagram, reliable datagram, reliable connected, and unreliable connected.

BRIEF SUMMARY

The present disclosure provides techniques to establish one or more connections for a virtual machine (VM) running on a host machine. Methods, systems, and techniques for establishing one or more connections between a target host machine and a remote endpoint connected to a VM running on a source host machine are provided.

According to an embodiment, a method of establishing one or more connections between a target host machine and a remote endpoint connected to a VM running on a source host machine includes receiving, by a target hypervisor executable on a target host machine, a list of one or more remote endpoints to which a VM executable on a source host machine is connected. The source and target host machines are coupled to a network. The method further includes initiating, by a host communication manager executable on the target host machine, a connection to one or more of the remote endpoints specified in the list before the VM has completed migration from the source host machine to the target host machine.

According to another embodiment, a system for establishing one or more connections between a target host machine and a remote endpoint connected to a VM running on a source host machine includes a target hypervisor that receives a list of one or more remote endpoints to which a VM executable on a source host machine is connected. The system also includes a host communication manager that initiates a connection to one or more of the remote endpoints specified in the list before the VM has completed migration from the source host machine to the target host machine. The source and target host machines are coupled to a network, and the target hypervisor and host communication manager are executable on the target host machine.

According to another embodiment, a non-transitory machine-readable medium includes a plurality of machine-readable instructions that when executed by one or more processors are adapted to cause the one or more processors to perform a method including: receiving, by a target hypervisor executable on a target host machine, a list of one or more remote endpoints to which a VM executable on a source host machine is connected, the source and target host machines being coupled to a network; and initiating, by a host communication manager executable on the target host machine, a connection to one or more of the remote endpoints specified in the list before the VM has completed migration from the source host machine to the target host machine.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIG. 6 is a flowchart illustrating a method of establishing one or more connections between the target host machine and remote endpoint connected to the VM(s) running on the source host machine, according to some embodiments.

DETAILED DESCRIPTION

I. Overview

Figure 1:
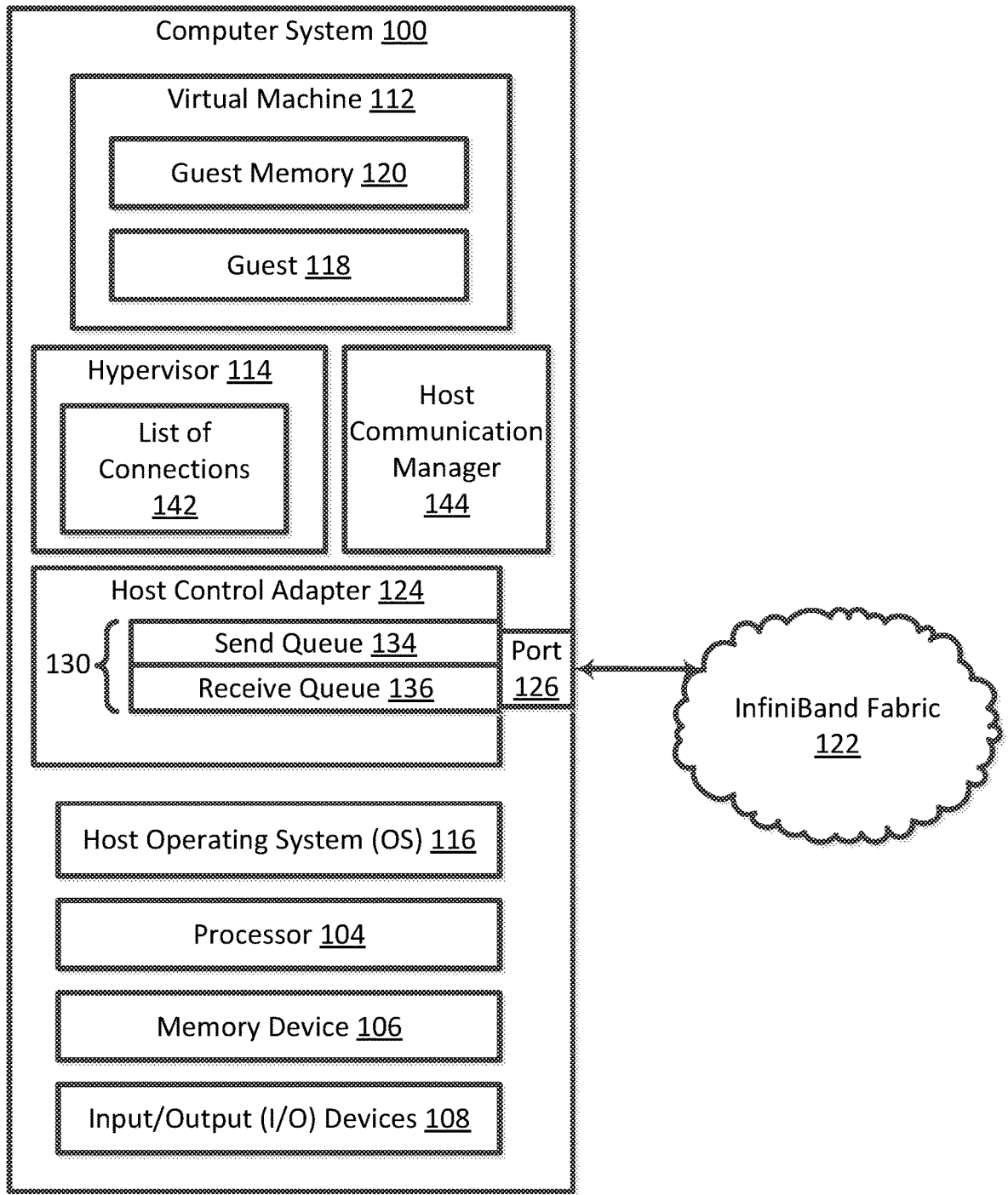
FIG. 1 depicts a diagram of one illustrative embodiment of a computer system in accordance with one or more aspects of the present disclosure.

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A VM may run on a source host machine and be connected to one or more remote endpoints via an IB network. The VM may be migrated from the source host machine to the target host machine. Migrating the VM may require tearing down the old connections associated with the VM at the source host machine and re-creating those connections at the target host machine. The connection establishment may be a slow process, resulting in service interruption for the migrated VM, or fallback on slower unconnected (e.g., datagram) communications. Unconnected communications typically have lower message size limits, which may result in packet fragmentation, compared to connected communications.

Typically, after the VM has completed migration to the target host machine, the connections are re-established at the target host machine. The target hypervisor may start receiving data packets for the VM and determine that no connection has been established on which to send data packets. Accordingly, the target hypervisor may start initiating connections on which to send data packets. After establishing the minimal connections, the target hypervisor may then be able to transfer data packets across the connections. It may be desirable to reduce this downtime.

The present disclosure provides techniques to establish connections between a target host machine and a remote endpoint, where the remote endpoint is connected to a VM running on a source host machine. Rather than wait for the VM to complete its migration to the target host machine, the source host machine may send the target host machine information about the VM's active connections. For example, while the VM is still running on the source host machine, a list of the VM's active connections may be retrieved from the source hypervisor and sent to the target host machine. The source host machine and target host machine may be interconnected to an IB fabric, and each may include its own host channel adapter (HCA) connecting the respective host machine to the IB fabric.

Before the VM has completed migration to the target host machine, the target host machine may receive a list of one or more remote endpoints to which the VM executable on the source host machine is connected. For each remote endpoint to which the VM is connected at the source host machine side, a host communication manager at the target host machine may initiate a connection between the target host machine's HCA and the remote endpoint to which the VM is connected on the source host machine. In this way, the target host machine may establish one or more connections to one or more remote endpoints to which the VM is connected at the source host machine. After the VM has migrated to the target host machine, one or more connections may already have been established and ready for the VM's use. Accordingly, the VM may start transmitting data packets to one or more of the remote endpoints using one or more of the established connections.

In an embodiment, a method of establishing one or more connections between a target host machine and a remote endpoint connected to a VM running on a source host machine includes receiving, by a target hypervisor executable on a target host machine, a list of one or more remote endpoints to which a VM executable on a source host machine is connected, the source and target host machines being coupled to a network. The method also includes initiating, by a host communication manager executable on the target host machine, a connection to one or more of the remote endpoints specified in the list before the VM has completed migration from the source host machine to the target host machine.

In another embodiment, a method of establishing one or more connections between a target host machine and a remote endpoint connected to a VM running on a source host machine includes identifying, by a source hypervisor executing on a source host machine, a list of one or more remote endpoints to which a VM executing on the source host machine is connected. The method also includes receiving, by the source hypervisor, an indication that the VM is to be migrated from the source host machine to a target host machine. The source and target host machines are coupled to a network such as the IB network. The method further includes sending, by the source hypervisor, the list of one or more remote endpoints to the target host machine before the VM has completed migration to the target host machine.

II. Example System Architecture

FIG. 1 depicts a diagram of one illustrative embodiment of a computer system 100 in accordance with one or more aspects of the present disclosure. Computer system 100 may include one or more physical processors 104 communicatively coupled to one or more memory devices 106 and input/output (I/O) devices 108.

"Physical processor" or "processor" herein shall refer to a device capable of executing instructions encoding arithmetic, logical, or I/O operations. In one illustrative example, a processor may follow the Von Neumann architectural model and may include an arithmetic logic unit (ALU), a control unit, and a plurality of registers. In a further aspect, a processor may be a single core processor that is capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a "central processing unit" (CPU).

"Memory device" herein shall refer to a volatile or non-volatile memory device, such as random access memory (RAM), read-only memory (ROM), Electrically Erasable Programmable Read-Only Memory (EEPROM), or any other device capable of storing data. "I/O device" herein shall refer to a device capable of providing an interface between one or more processor pins and an external device capable of inputting and/or outputting binary data. Processors 104 may be interconnected using a variety of techniques, ranging from a point-to-point processor interconnect to a system area network 110. Local connections within each computer system 100, including the connections between one or more processors 104, one or more memory devices 106, and/or one or more I/O devices 108 may be provided by one or more local buses of a suitable architecture.

Computer system 100 may be a host machine that runs one or more virtual machines 112 by executing a hypervisor 114 above the hardware and below the virtual machines. In one illustrative example, hypervisor 114 may be a component of a host operating system (OS) 116 executed by computer system 100. Alternatively, hypervisor 114 may be provided by an application running under host OS 116, or may run directly on computer system 100 without an OS beneath it. Hypervisor 114 may allow multiple OSs, called guests or guest OSs, to run on the same physical system by offering virtualized hardware to the guests. The host machine may run multiple OSs, concurrently and in isolation from other programs on a single system. A guest may run a different OS than another guest executing on the same host machine. Additionally, the guest running on a VM may also be different from the host OS running on computer system 100. The host OS or guest may include, for example, MICROSOFT® WINDOWS®, LINUX®, SOLARIS®, and MAC® OSs. Trademarks are the property of their respective owners.

Hypervisor 114 owns the real system resources and makes them available to one or more guests that alternately execute on the same hardware. Hypervisor 114 manages hardware resources and arbitrates requests from one or more guests and application stacks. One or more guests and application stacks may be run on top of hypervisor 114. Hypervisor 114 may abstract the physical layer, including processors, memory, and I/O devices, and present this abstraction to virtual machine 112. In the example illustrated in FIG. 1, VM 112 is the platform (e.g., virtual hardware) on which a guest 118 runs, which utilizes the underlying virtual devices. In an example, hypervisor 114 presents a virtual set of CPU, memory, I/O, and disk resources to each guest either based on the actual physical hardware or based on a standard and consistent selection of custom hardware. A VM has its own address space in memory, its own processor resource allocation, and its own device I/O using its own virtual device drivers. Hypervisor 114 may map a virtual resource or state (e.g., registers, memory, or files) to real resources in the underlying machine. For example, hypervisor 114 may present a guest memory 120 to guest 118, and memory locations of guest memory 120 may be mapped to physical memory locations in memory device 106.

Computer system 100 may be an InfiniBand (IB) node interconnected to an IB fabric 122 including one or more IB switches. Each IB node or switch may attach to a single or multiple switches or directly to another IB node or switch. Two or more IB subnets may be interconnected by one or more IB routers. The IB architecture is a fabric communication and management infrastructure supporting both I/O and inter-processor communications (IPC) for one or more computer systems. IB fabric 122 allows many devices to concurrently communicate with high bandwidth and low latency in a protected, remotely managed environment.

Each IB node includes one or more HCAs, and each HCA includes one or more ports and one or more queue pairs. Each queue pair has a queue pair number (QPN) assigned by the HCA, which uniquely identifies the queue pair within the HCA. When the HCA receives a data packet, the HCA uses the context of the destination QPN to process the packet. Computer system 100 connects to IB fabric 122 via a HCA 124. Computer system 100 communicates over HCA 124 using port 126 and paths through IB fabric 122. An HCA represents the local channel interface and includes one or more queue pairs associated with computer system 100. A send queue and a receive queue are paired to form a queue pair and are created as a pair. A queue pair is a memory-based abstraction where communication may be achieved through direct memory-to-memory transfers between applications and devices. HCA 124 includes a queue pair 130, and a send queue 134 and a receive queue 136 form queue pair 130.

One or more of the VMs running on hypervisor 114 may establish a connection to one or more remote endpoints interconnected to IB fabric 122. In some examples, host communication manager 144 establishes a connection between a VM running on computer system 100 and a remote endpoint. In an example, the remote endpoint is a VM running on the host machine. In another example, the remote endpoint is not a VM. Host communication manager 144 may establish the connection by linking a queue pair on computer system 100 to a queue pair on a remote endpoint (a remote queue pair). For each of the VM's running in computer system 100, hypervisor 114 may track their connections to remote endpoints and maintain a list specifying the remote endpoints to which the one or more VMs are connected. Hypervisor 114 maintains a list of connections 142 specifying one or more remote endpoints to which VM(s) executing on computer system 100 are connected.

III. VM Migration

Figure 2:
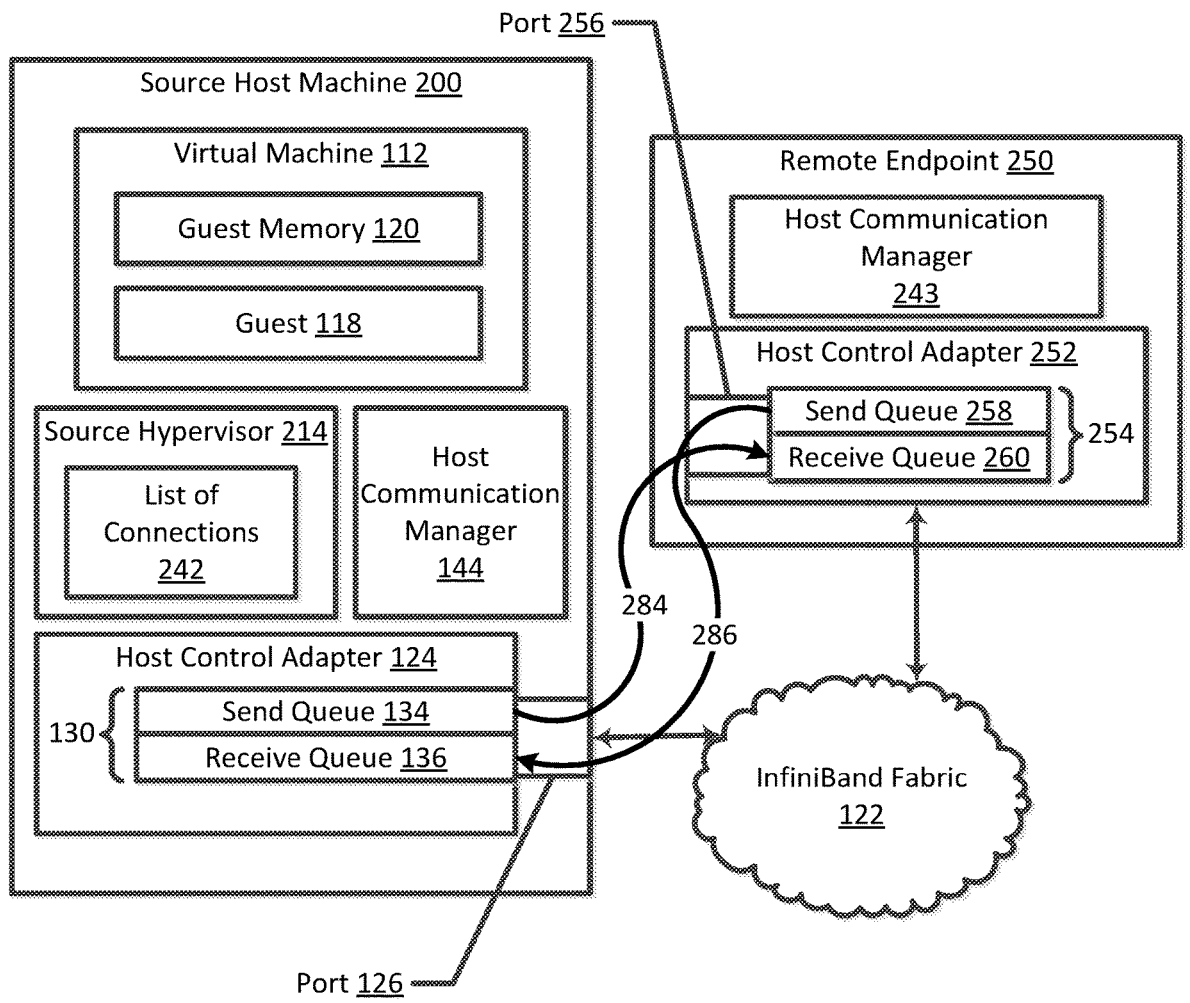
FIG. 2 depicts a diagram of one illustrative embodiment of a source host machine connected to a remote endpoint via an InfiniBand (IB) network, according to some embodiments.

FIG. 2 depicts a diagram of one illustrative embodiment of a source host machine connected to a remote endpoint via an IB network, according to some embodiments. In FIG. 2, a source hypervisor 214 executes on a source host machine 200, and may identify a list of connections 242 specifying one or more remote endpoints to which one or more VMs executing on source host machine 200 are connected.

A port has a local 16-bit identifier (LID) assigned by a local subnet manager (not shown). Within the subnet, LIDs are unique. Switches in IB fabric 122 use the LID to route packets within the subnet. The local subnet manager configures routing tables in switches based on LIDs and the location of that port with respect to the specific switch. Each packet contains a source LID (SLID) that identifies the port that injected the packet into the subnet and a destination LID (DLID) that identifies the port where the IB fabric is to deliver the packet.

A port also has at least one global identifier (GID) that is an IPv6 address. GIDs are globally unique. Each packet optionally contains a global route header (GRH) specifying a source GID (SGID) that identifies the port that injected the packet into the fabric and a destination GID (DGID) that identifies the port where the fabric is to deliver the packet. Routers use the GRH to route packets between subnets. Switches may ignore the GRH. In general, GIDs are constructed by prepending a 64-bit GID prefix onto a GUID. The GID prefix is user defined and is unique for each IB subnet.

Data communicated from one IB endpoint to another IB endpoint may be done via IB fabric 122 and the queue pairs associated with the IB endpoints. After a queue pair is created, it can be connected to a remote queue pair to establish a connection. Each port on an HCA may support a set of services, and each service may be identified by a service ID. Host communication manager 144 may establish a connection to a remote node using a service ID. The service ID is the identifier of the service on the port specified by the port GID, and is a value that allows a host communication manager to associate an incoming connection request with the entity providing the service. The service ID may be used to resolve connection requests by, for example, resolving queue pairs. A request node sends a "request for communication" message to a target node with which the request node desires to connect. The target node of the "request for communication" message may use the service ID to direct the request to the entity that decides whether to proceed with the communication establishment, and provides the service ID to queue pair resolution as part of the communication management process.

In FIG. 2, a remote endpoint 250 includes an HCA 252 and a host communication manager 243, and is interconnected to IB fabric 122 via the HCA. HCA 252 includes a queue pair 254, and remote endpoint 250 communicates over HCA 252 using port 256 and paths through IB fabric 122. A send queue 258 and a receive queue 260 form queue pair 254. Host communication manager 144 running on source host machine 200 and host communication manager 243 running on remote endpoint 250 may establish connections 284 and 286 between VM 112 running on source host machine 200 and remote endpoint 250. In an example, connections 284 and 286 are connections between VM 112 and a VM running on remote endpoint 250. In another example, connections 284 and 286 are not connections between two VMs.

To establish an IB connection between VM 112 and remote endpoint 250, host communication manager 144 and host communication manager 243 may use a three-way handshake. In an example, remote endpoint 250 is the request node and source host machine 200 is the target node. In such an example, host communication manager 243 sends a "request for communication" message to host source machine 200. Host communication manager 144 may listen for incoming connection requests. After receiving the connection request, host communication manager 144 may send a connection response or reject message back to host communication manager 243 along with the service ID that identifies a service provided by port 130, which is associated with VM 112. Send queue 134 and receive queue 136 may be associated with VM 112 such that VM 112 may send data packets to send queue 134 for transmission to a remote endpoint and may process data packets from receive queue 136.

Host communication manager 243 may complete connections 284 and 286 by sending a ready to use (RTU) message back to host communication manager 144. Accordingly, host communication managers 144 and 243 may connect send queue 134 with receive queue 260 located at remote endpoint 250, and connect receive queue 136 with send queue 258 located at remote endpoint 250. Queue pair 130 is connected to remote queue pair 254, and this connection may be specified in list of connections 242. For example, list of connections 242 may include the address of remote endpoint 250 along with the service ID associated with the port. VM 112 may send data packets to remote endpoint 250 by placing the data packets on send queue 134 for transmission to receive queue 260 located at remote endpoint 250, and receive data packets from remote endpoint 250 by processing data packets from receive queue 136. It should also be understood that a one-way connection may be established between VM 112 and remote endpoint 250.

Figure 3:
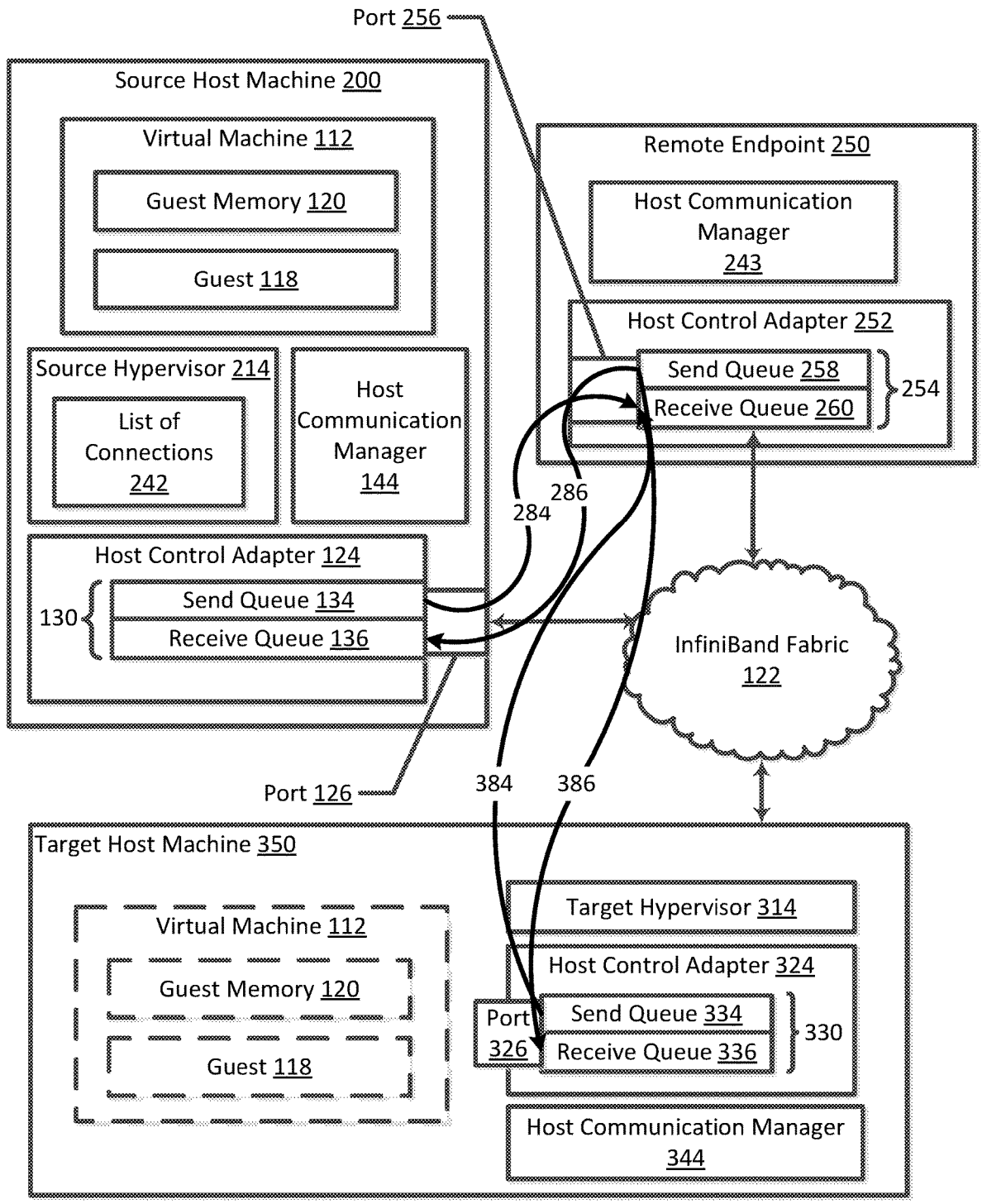
FIG. 3 depicts a diagram of one illustrative embodiment of a target host machine establishing one or more IB connections to one or more remote endpoints connected to a virtual machine (VM) running on the source host machine, according to some embodiments.

FIG. 3 depicts a diagram of one illustrative embodiment of a target host machine establishing one or more IB connections to one or more remote endpoints connected to a VM running on the source host machine, according to some embodiments. FIG. 3 includes a target host machine 350 including a target hypervisor 314, HCA 324, and host communication manager 344. HCA 324 includes a queue pair 330, and target host machine 350 communicates over HCA 324 using port 330 and paths through IB fabric 122. A send queue 334 and a receive queue 336 form queue pair 330.

Source host machine 200 and target host machine 350 are interconnected via an IB network. Source hypervisor 214 may receive an indication that VM 112 is to be migrated from source host machine 200 to target host machine 350. To assist target host machine 350 in establishing connections to one or more of the remote endpoints specified in list of connections 214 before VM 112 has completed migration to target host machine 350, source hypervisor 214 may send list of connections 242 to target host machine 350 before VM 112 has completed migration to target host machine 350. In an example, list of connections 242 includes all active connections of all VMs running on source hypervisor 214. In another example, list of connections 242 is VM specific, and each VM running on source host machine 200 has its own associated list of connections.

Rather than immediately tear down the VM's active connections, source hypervisor 214 may leave the existing connections and send list of connections 242 to target host machine 350, which identifies the remote endpoints to which VM 112 is connected from the list. In an example, source hypervisor 214 sends list of connections 242 to target host machine 350 in response to the indication that VM 112 is to be migrated from source host machine 200 to target host machine 350. In another example, source hypervisor 214 sends list of connections 242 to target host machine 350 before source hypervisor 214 receives the indication that VM 112 is to be migrated from source host machine 200 to target host machine 350.

The information included in list of connections 242 may be dependent on the way the connections are established. In an example, for native IB connections, list of connections 242 may include the service ID and HCA port ID (GID or LID) associated with each of VM 112's connections (e.g., port ID assigned to port 130). In such an example, source hypervisor 214 may send the service ID associated with port

130 and port 130's GID or LID to target host machine 350 in order for target host machine 350 to establish a connection to remote endpoint 250 before VM 112 has completed migration to target host machine 350. In another example, for a connection management agent for IB or Remote Direct Memory Access (RDMA) over Ethernet I, list of connections 242 may include the Internet protocol (IP) address of remote endpoint 250 and the HCA port ID (GID or LID) associated with each of VM 112's connections. In such an example, source hypervisor 214 may send remote endpoint 250's IP address and port 130's GID or LID to target host machine 350 in order for target host machine 350 to establish a connection to remote endpoint 250 before VM 112 has completed migration to target host machine 350.

Source hypervisor 214 may track the connections of each of the VMs running on the source hypervisor to provide target host machine 350 with the most up-to-date connections. In an example, source hypervisor 214 detects a new connection between VM 112 and a remote endpoint, and adds this information about the new connection to list of connections 242. Depending on the way the connections are established, source hypervisor 214 may add the service ID and port ID associated with the new connection to list of connections 242, or may add the IP address of the new remote endpoint along with the HCA port ID associated with the new connection to list of connections 242.

In another example, source hypervisor 214 detects a dropped connection between VM 112 and a remote endpoint specified in list of connections 242, and removes the remote endpoint from the list of connections. Accordingly, when source hypervisor 214 sends target hypervisor 314 the list of connections, the list may include the most-up-to date information about the VM connections associated with source host machine 200. Source hypervisor 214 may detect the new connections or dropped connections before, during, or after VM migration. Accordingly, source hypervisor 214 may send target host machine 350 an up-to-date list of the VM's connections.

Target host machine 350 receives list of connections 242 and may establish connections 384 and 386 to the one or more remote endpoints specified in list of connections 242 before the one or more VMs has completed migration to target host machine 350. Connection 384 and/or connection 386 may be established prior to VM 112 being fully migrated and running on target host machine 350. The dashed lines around VM 112, guest memory 120, and guest 118 in target host machine 350 indicate that VM 112 has not yet completed migration to target host machine 350. At this point in time, source host machine 200 may still receive data packets from remote endpoint 250 via receive queue 136 or send data packets to remote endpoint 250 via send queue 134 for VM 112 through port 130.

In some examples, during the migration of VM 112 from source host machine 200 to target host machine 350, source hypervisor 214 sends list of connections 242 specifying the remote endpoints to which VM 112 is connected to target host machine 350. During migration of VM 112 from source host machine 200 to target host machine 350, target host machine 350 may initiate a connection to remote endpoint 250. Target host machine 350 may recreate the same connections to these remote endpoints as VM 112's original connections on source host machine 200, thus saving time in establishing these connections.

In an example, source host machine 200 sends target host machine 350 a special connection management packet that causes target host machine 350 to initiate and establish connections 384 and 386. Host communication manager 344 in target host machine 350 may initiate connections to remote nodes specified in list of connections 242 using the three-way handshake discussed above. For example, host communication manager 344 may use the information provided in list of connections 242 to establish connections to the remote endpoints specified in the list. In some embodiments, host communication manager 344 may use the service ID and HCA port ID (GID or LID) associated with each of VM 112's connections (e.g., port ID assigned to port 130) specified in the list of connections to establish a connection to remote endpoint 250 and other remote endpoints (if applicable). In some embodiments, host communication manager 344 may use the IP address of remote endpoint 250 and the HCA port ID (GID or LID) associated with each of VM 112's connections specified in the list of connections to establish a connection to remote endpoint 250 and other remote endpoints (if applicable).

In this way, queue pair 330 may be connected to remote queue pair 254 located at remote endpoint 250 and specified in list of connections 242. By the time VM 112 has complete migration from source host machine 200 to target host machine 350, some of these connections (e.g., connections 384 and 386) may already be established, and VM 112 may use one or more of these established connections to receive or send data packets. Accordingly, VM 112 may continue closer to where it left off when running on source host machine 200 compared to waiting for VM 112 to complete its migration over to target host machine 350 before communicating with the remote endpoints.

Figure 4:
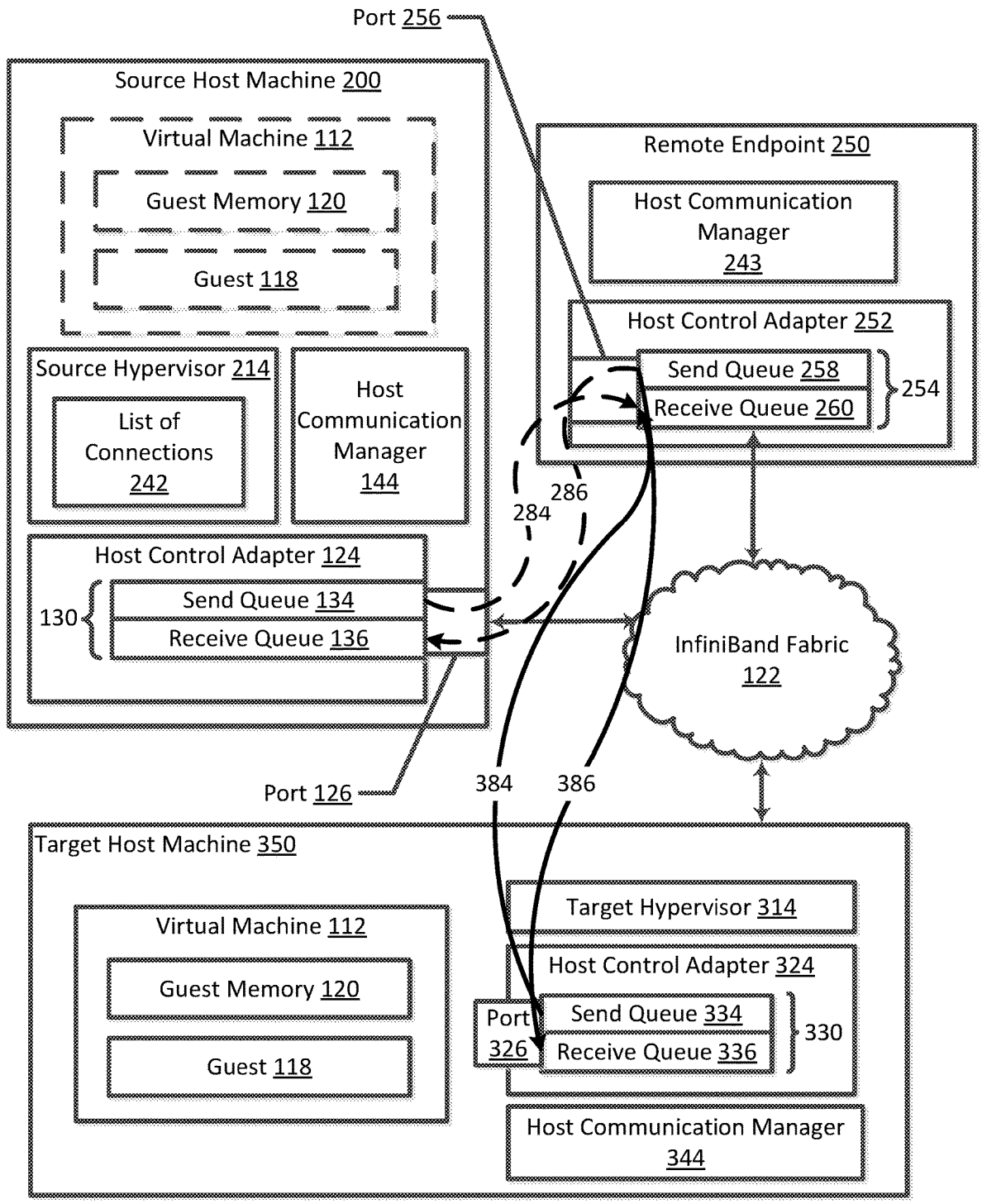
FIG. 4 depicts a diagram of one illustrative embodiment of a migrated VM using an IB connection that was established before the VM completed migration to the target host machine, according to some embodiments.

FIG. 4 depicts a diagram of one illustrative embodiment of a migrated VM using an IB connection that was established before the VM completed migration to the target host machine, according to some embodiments. In FIG. 4, VM 112 has completed migration from source host machine 200 to target host machine 350, as indicated by the solid lines around VM 112, guest memory 120, and guest 118 in target host machine 350. VM 112 may execute on target host machine 350 and send a data packet on one of the connections established by target host machine 350 to one or more of the remote endpoints specified in list of connections 242. For example, VM 112 may send a data packet to remote endpoint 250 via IB fabric 122 by placing the data packet on send queue 334 for transmitting to receive 260. Alternatively, VM 112 may process a data packet from remote endpoint 250 via IB fabric 122 by retrieving the data packet from receive queue 336 for processing.

Source host machine 200 may destroy connections 284 and 286 because they are no longer needed. VM 112 has completed its migration from source host machine 200 to target host machine 350 and thus may receive and send data packets from target host machine 350. In FIG. 4, the destroyed connections 284 and 286 are indicated by the dashed lines. Additionally, the dashed lines around VM 112, guest memory 120, and guest 118 in source host machine 200 indicate that VM 112 has completed migration to target host machine 350. At this point in time, target host machine 350 may receive data packets from remote endpoint 250 via receive queue 336 or send data packets to remote endpoint 250 via send queue 334 for VM 112 through port 326.

As discussed above and further emphasized here, FIGS. 1-4 are merely examples, which should not unduly limit the scope of the claims. For example, although a host machine is illustrated as including one VM, it should be understood that embodiments including more than one VM running on a host machine are within the scope of the disclosure. One or more VMs running on a hypervisor may be connected to one or more remote queue pairs via IB fabric 122. In an example, source hypervisor 214 may identify a second list of connections specifying one or more remote endpoints to which a second VM executing on source host machine 200 is connected. Source hypervisor 214 may receive an indication that the second VM is to be migrated from source host machine 200 to a second target host machine and send the second list of connections to the second target host machine before the second VM has completed migration to the second target host machine. The source and second target host machines are both interconnected to the InfiniBand fabric. The second target host machine may be target host machine 350 or a different target host machine interconnected to the InfiniBand fabric.

Additionally, although an HCA is illustrated as including one queue pair, it should be understood that embodiments in which an HCA includes more than one queue pair connected to one or more remote queue pairs is within the scope of the disclosure.

IV. Example Methods

Figure 5:
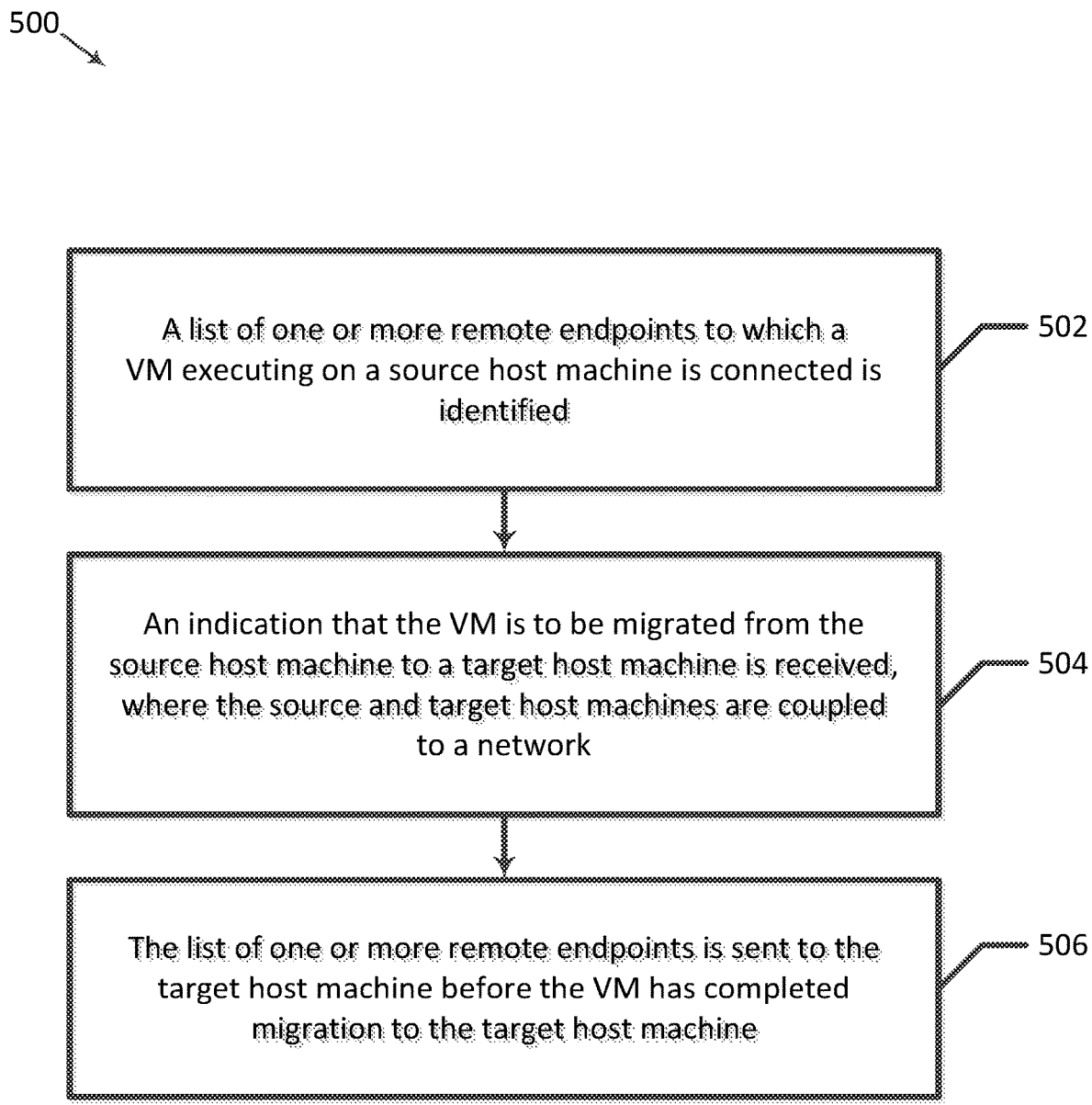
FIG. 5 is a flowchart illustrating a method of establishing one or more connections between the target host machine and remote endpoint connected to the VM(s) running on the source host machine, according to some embodiments.

FIG. 5 is a flowchart illustrating a method 500 of establishing one or more connections between a target host machine and a remote endpoint connected to a VM running on a source host machine, according to some embodiments. Method 500 is not meant to be limiting and may be used in other applications.

In FIG. 5, method 500 includes blocks 502-506. In a block 502, a list of one or more remote endpoints to which a VM executing on a source host machine is connected is identified. In an example, source hypervisor 214 identifies list of connections 242 specifying one or more remote endpoints to which VM 112 executing on source host machine 200 is connected. List of connections 242 may include remote endpoint 250 as one of the remote endpoints to which VM 112 is connected. Additionally, list of connections 242 may include other remote endpoints to which VM 112 is actively connected and/or may include other remote endpoints to which other VMs executing on source host machine 200 are connected.

In a block 504, an indication that the VM is to be migrated from the source host machine to a target host machine is received, where the source and target host machines are coupled to a network. In an example, source hypervisor 214 receives an indication that VM 112 is to be migrated from source host machine 200 to target host machine 350, where source host machine 200 and target host machine 350 are coupled to an IB network. In a block 506, the list of one or more remote endpoints is sent to the target host machine before the VM has completed migration to the target host machine. In an example, source hypervisor 214 sends list of connections 242 specifying one or more remote endpoints to target host machine 350 before VM 112 has completed migration to target host machine 350. Source hypervisor 214 may send list of connections 242 to target host machine 350 in response to the indication or before receiving the indication that VM 112 is to be migrated from source host machine 200 to target host machine 350.

In some embodiments, one or more actions illustrated in blocks 502-506 may be performed for any number of VMs executing on one or more host machines. It is also understood that additional processes may be performed before, during, or after blocks 502-506 discussed above. It is also understood that one or more of the actions of method 500 described herein may be omitted, combined, or performed in a different sequence as desired.

FIG. 6 is a flowchart illustrating a method 600 of establishing one or more connections between a target host machine and a remote endpoint connected to a VM running on a source host machine, according to some embodiments. Method 600 is not meant to be limiting and may be used in other applications.

In FIG. 6, method 600 includes blocks 602-604. In a block 602, a list of one or more remote endpoints to which a VM executable on a source host machine is connected is received, the source and target host machines being coupled to a network. In an example, target hypervisor 314 receives list of connections 242 specifying one or more remote endpoints to which VM 112 executable on source host machine 200 is connected, source host machine 200 and target host machine 350 being coupled to an IB network.

In a block 604, a connection to one or more of the remote endpoints specified in the list is initiated before the VM has completed migration from the source host machine to the target host machine. In an example, host communication manager 344 initiates connection 384 and/or connection 386 to one or more of the remote endpoints specified in list of connections 242 before VM 112 has completed migration from source host machine 200 to target host machine 350.

In some embodiments, one or more actions illustrated in blocks 602-604 may be performed for any number of VMs being migrated from one or more source host machines to target host machine 350. It is also understood that additional processes may be performed before, during, or after blocks 602-604 discussed above. It is also understood that one or more of the actions of method 600 described herein may be omitted, combined, or performed in a different sequence as desired.

V. Example Computing System

Figure 7:
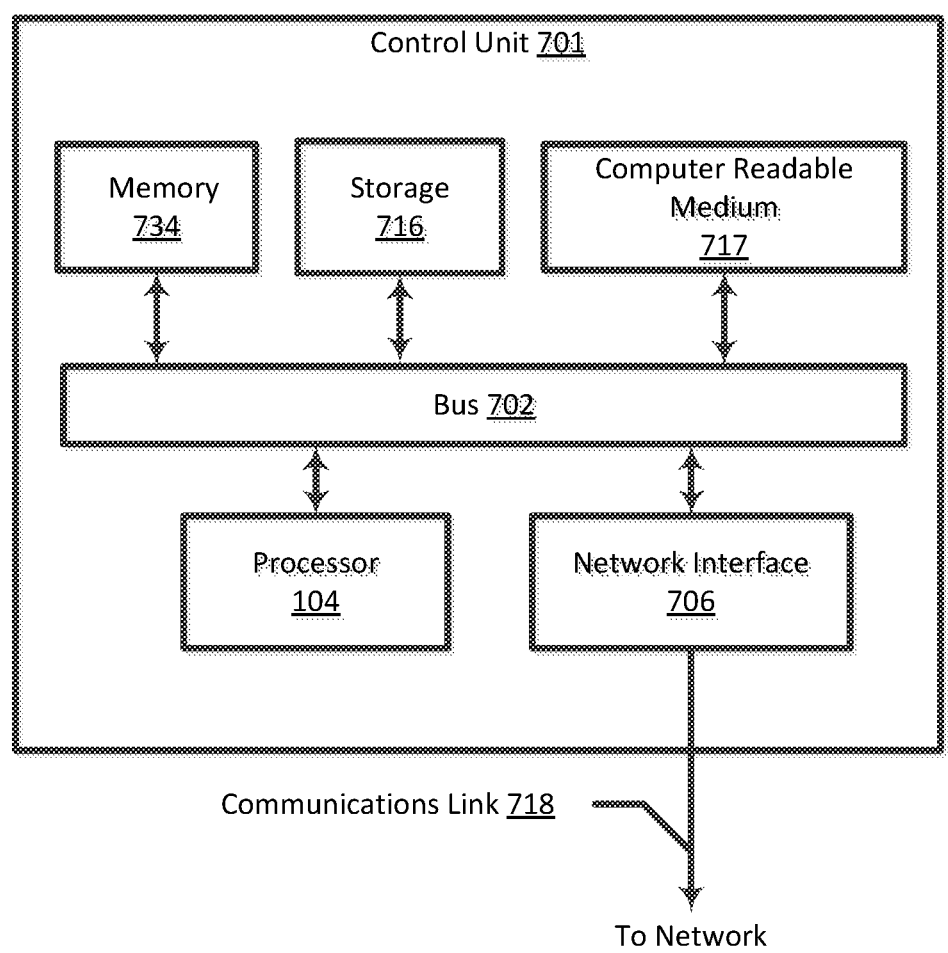
FIG. 7 is a block diagram of an electronic system suitable for implementing one or more embodiments of the present disclosure.

FIG. 7 is a block diagram of an example computer system 700 suitable for implementing any of the embodiments disclosed herein. In various implementations, each of computer system 100, source host machine 200, remote endpoint 250, and target host machine 350 may be implemented on computer system 700. The computer system 700 may include one or more processors 104. The computer system 700 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 700 includes a bus 702 or other communication mechanism for communicating information data, signals, and information between various components of computer system 700. A transceiver or network interface 706 transmits and receives signals between computer system 700 and other devices via a communications link 718 to a network. In an embodiment, the transmission is wireless, although other transmission mediums and methods may also be suitable.

A processor 104, which may be a micro-controller, digital signal processor (DSP), or other processing component, processes these various signals, such as for display or transmission to other devices via communication link 718. A processor may also control transmission of information, such as cookies or IP addresses, to other devices.

Components of computer system 700 also include a system memory component 734 (e.g., RAM), a static storage component 716 (e.g., ROM), and/or a computer readable medium 717. Computer system 700 performs specific operations by one or more processors 104 and other components by executing one or more sequences of instructions contained in system memory component 734. Logic may be encoded in computer readable medium 717, which may refer to any medium that participates in providing instructions to one or more processors 104 for execution. Such a medium may take many forms, including but not limited to, non-volatile media, volatile media, and transmission media.

In various implementations, non-volatile media include optical, or magnetic disks, or solid-state drives, volatile media include dynamic memory, such as system memory component 734, and transmission media include coaxial cables, copper wire, and fiber optics, including wires that include bus 702. In an embodiment, the logic is encoded in non-transitory computer readable medium. Computer readable medium 717 may be any apparatus that can contain, store, communicate, propagate, or transport instructions that are used by or in connection with processor 104. Computer readable medium 717 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 500 and/or method 600) to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system comprising:
a target hypervisor that receives a first list of one or more remote endpoints to which a first VM executable on a first source host machine is connected and receives a second list of one or more remote endpoints to which a second VM executable on a second source host machine is connected, wherein the first list is received before the first VM has competed migration to a target host machine from the first source host machine, and the second list is received before the second VM has competed migration to the target host machine from the second source host machine; and
a host communication manager that establishes a first network connection to a first remote endpoint included in the first list before the first VM has completed migration from the first source host machine to the target host machine and that establishes a second network connection to a second remote endpoint included in the second list before the second VM has completed migration from the second source host machine to the target host machine.

2. The system of claim 1, wherein the first source host machine and the target host machine are coupled to an InfiniBand network.

3. The system of claim 2, wherein the target host machine is an InfiniBand node including one or more Host Channel Adaptors (HCA), each HCA includes one or more ports and one or more queue pairs, and the target host machine connects to an InfiniBand fabric via an HCA.

4. The system of claim 3, wherein a port on an HCA supports a set of services, and each service is identified by a service identifier (ID).

5. The system of claim 4, wherein the host communication manager establishes the first network connection to the first remote node by using the service ID, and the host communication manager associates an incoming connection request with an entity providing the service identified by the service ID.

6. The system of claim 3, wherein a queue pair includes a receive queue, and the target hypervisor receives data packets from the first remote endpoint via the receive queue for the first VM.

7. The system of claim 6, wherein the queue pair further includes a send queue, and the target hypervisor sends data packets to the first remote endpoint via the send queue for the first VM.

8. The system of claim 1, wherein the first remote endpoint is a VM.

9. The system of claim 1, wherein the first remote endpoint is different from a VM.

10. The system of claim 1, comprising:
a source hypervisor executable on the first source host machine, wherein the source hypervisor tracks one or more network connections to which the first VM is connected.

11. The system of claim 10, wherein the source hypervisor detects a new connection between the first VM and a new remote endpoint and adds information based on the new connection to the first list.

12. The system of claim 11, wherein the source hypervisor adds a service ID and a port ID associated with the new connection to the first list.

13. The system of claim 11, wherein the source hypervisor adds an Internet Protocol (IP) address of the new remote node and a port ID associated with the new connection to the first list.

14. The system of claim 13, wherein the port ID is an HCA port ID.

15. A method comprising:
receiving, by a target hypervisor executable on a target host machine, a first list of one or more remote endpoints to which a first virtual machine (VM) executable on a first source host machine is connected, wherein the first list is received before the first VM has competed migration to the target host machine from the first source host machine;
receiving, by the target hypervisor, a second list of one or more remote endpoints to which a second VM executable on a second source host machine is connected, wherein the second list is received before the second VM has competed migration to the target host machine from the second source host machine;
establishing, by a host communication manager executable on the target host machine, a first network connection to one or more of the remote endpoints included in the first list before the first VM has completed migration from the first source host machine to the target host machine; and
establishing, by the host communication manager, a second network connection to one or more of the remote endpoints included in the second list before the second VM has completed migration from the second source host machine to the target host machine.

16. The method of claim 15, wherein the first source host machine and the target host machine are coupled to an InfiniBand network.

17. The method of claim 15, wherein the first list is specific to the first VM and the second list is specific to the second VM.

18. A machine-readable medium comprising a plurality of machine-readable instructions that when executed by one or more processors is adapted to cause the one or more processors to perform a method comprising:
receiving, by a target hypervisor executable on a target host machine, a first list of one or more remote endpoints to which a first virtual machine (VM) executable on a first source host machine is connected, wherein the first list is received before the first VM has competed migration to the target host machine from the first source host machine;
receiving, by the target hypervisor, a second list of one or more remote endpoints to which a second VM executable on a second source host machine is connected, wherein the second list is received before the second VM has competed migration to the target host machine from the second source host machine; and
establishing, by a host communication manager executable on the target host machine, a first network connection to one or more of the remote endpoints included in the first list before the first VM has completed migration from the first source host machine to the target host machine; and
establishing, by the host communication manager, a second network connection to one or more of the remote endpoints included in the second list before the second VM has completed migration from the second source host machine to the target host machine.

19. The system of claim 1, wherein the first source host machine is different from or the same as the second source host machine.

20. The method of claim 15, wherein the first source host machine is different from or the same as the second source host machine.

* * * * *